June 24, 1930.　　　A. W. SIZER　　　1,768,008

MACHINE FOR THE MOLDING OF PLASTIC SUBSTANCES

Filed Nov. 12, 1929

INVENTOR
Albert W. Sizer,
BY
ATTORNEYS

Patented June 24, 1930

1,768,008

UNITED STATES PATENT OFFICE

ALBERT WILLIAM SIZER, OF HESSLE, ENGLAND

MACHINE FOR THE MOLDING OF PLASTIC SUBSTANCES

Application filed November 12, 1929, Serial No. 406,612, and in Great Britain November 10, 1928.

The present invention relates to improvements in machines for the molding of plastic substances.

The machine will be more particularly described with reference to a construction particularly suitable for the molding of cakes for the feeding of cattle from vegetable seeds and the like material.

According to the present invention the material is fed to a space between a pair of cylinders or rollers, one or both of which is hollow, and one or both of which have ports or passages extending from the outer periphery to the inside through which material will be compressed or extruded to be severed in the form of free cakes or pellets by a stationary knife.

The invention is more particularly described with reference to the accompanying drawings in which:—

Figure 1:
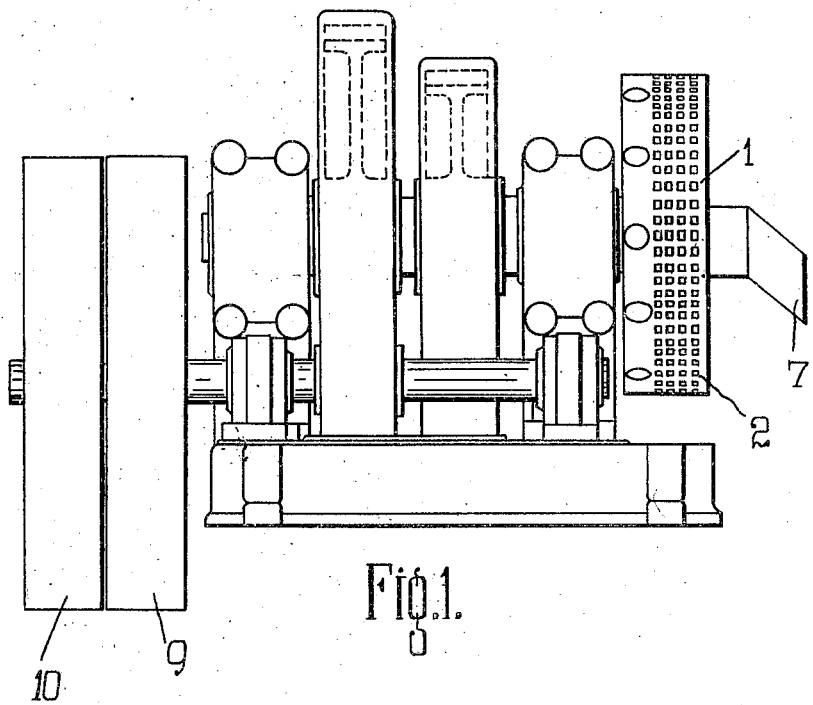
Figure 1 is an outside elevation of one form of construction.
Figure 2:
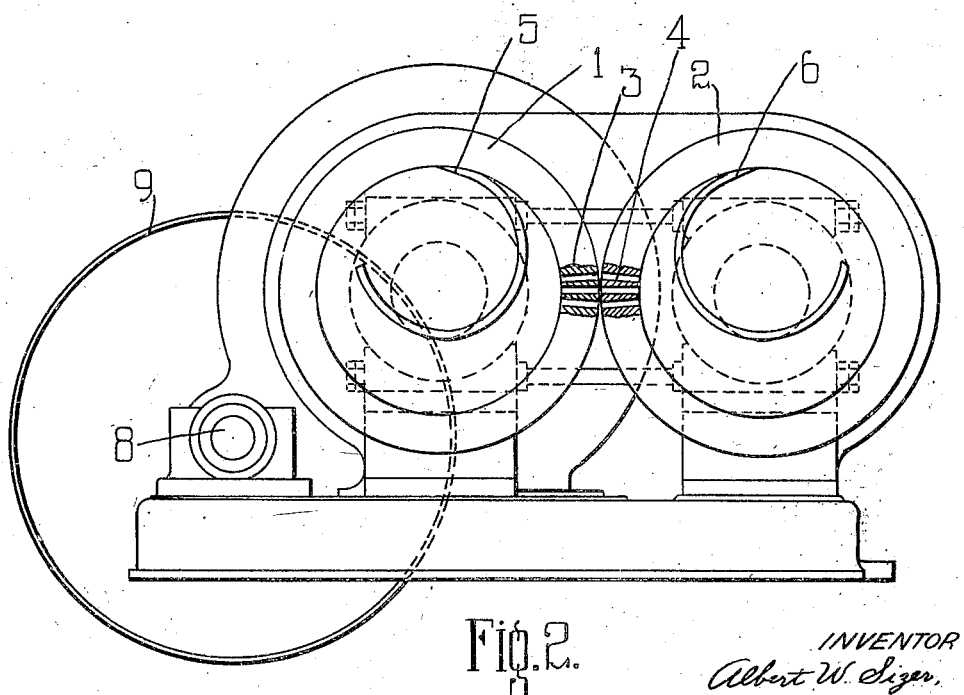
Figure 2 is a corresponding side view partly in section.

Material, such as animal or vegetable meal, or mixtures of these, when for instance, it is desired to make cattle cake, is fed into a space between a pair of hollow cylinders 1, 2, or in the arrangement shown, are both hollow and provided with radial passages, 3, 4, extending from the outer periphery to the inside, so that as the material is compressed between them it is extruded to the inner periphery of these cylinders, and will eventually be stripped from the said inner peripheries by knives 5, 6, respectively which are preferably in the form of a cylinder having one edge sharpened to form chutes extending axially of the rolls to the outside as shown at 7 to lead the material in the form of pellets or cakes away from the machine.

One or both compression cylinders 1, 2, may be positively driven, but normally it will be preferable to intergear these and to drive them from a common counter-shaft 8 provided with fast and loose pulleys 9, 10.

I declare that what I claim is:—

A machine for molding plastic substances comprising a hollow cylinder having radial ports through its wall, a second cylinder in intimate contact with the outside of said first cylinder and adapted to cooperate therewith to force the plastic substances through the radial ports into the internal cavity of said first cylinder, and a stationary knife of partial cylindrical shape providing a receiving trough within said hollow cylinder and providing a knife edge intimately engaged with the inner surface of said first cylinder, and means to rotate said first cylinder, said knife cooperating with said first cylinder to cut off and convey axially out of the first cylinder the material forced through the ports thereof by the second cylinder.

In witness whereof, I have hereunto signed my name this 1st day of November, 1929.

ALBERT WILLIAM SIZER.